Jan. 23, 1945.  J. E. GRIFFITH  2,367,676
ROTARY INTERNAL-COMBUSTION ENGINE
Filed July 27, 1943  6 Sheets-Sheet 1
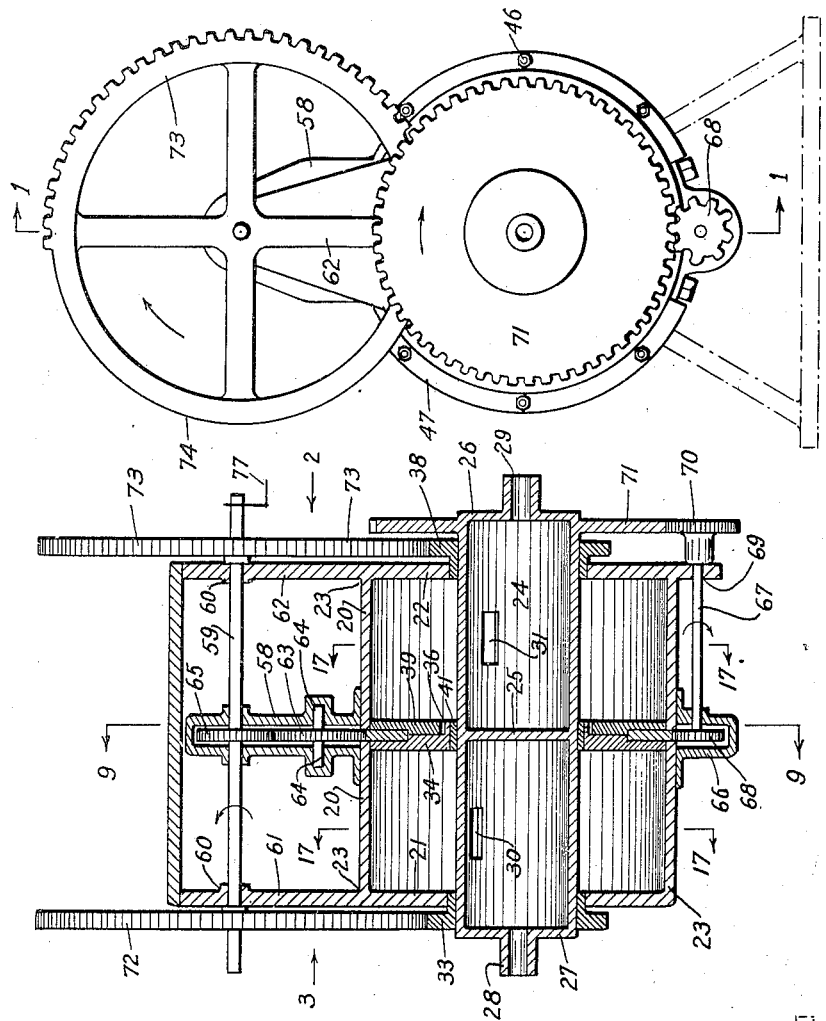
Fig. 2
Fig. 1
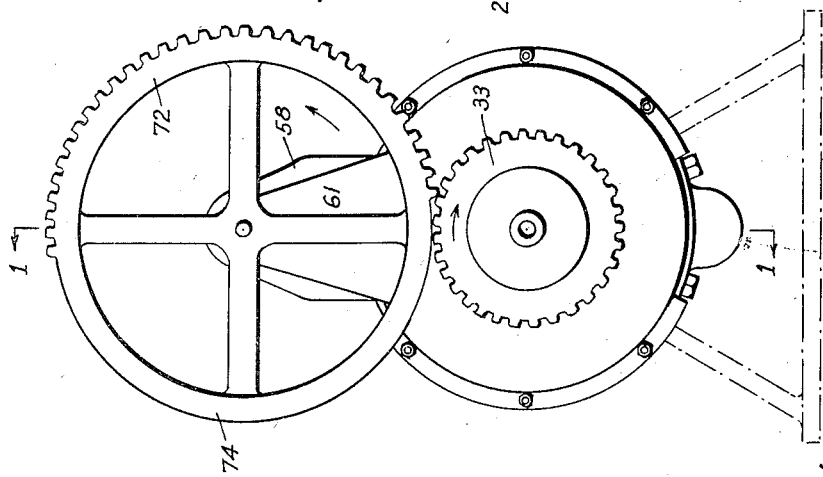
Fig. 3
INVENTOR.
JAMES E. GRIFFITH
BY Martin E. Anderson
ATTORNEY.

Jan. 23, 1945. J. E. GRIFFITH 2,367,676
ROTARY INTERNAL-COMBUSTION ENGINE
Filed July 27, 1943 6 Sheets-Sheet 2
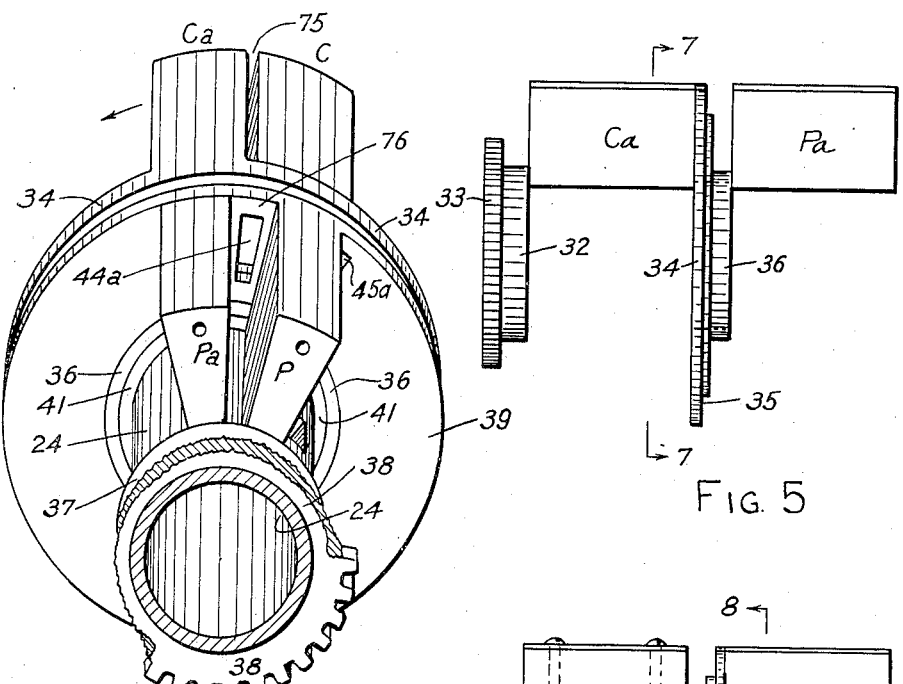
FIG. 4
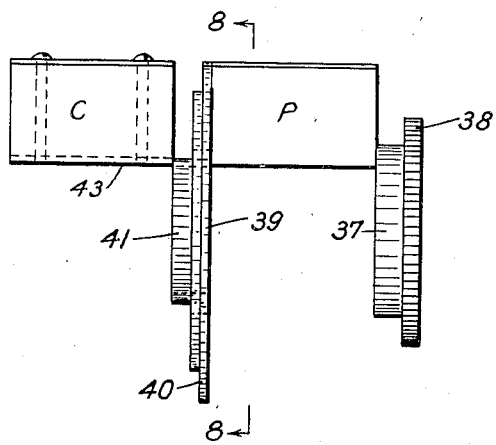
FIG. 5
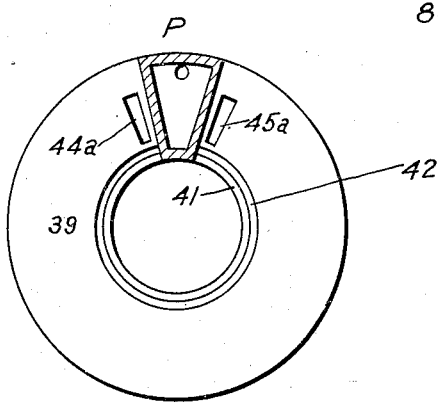
FIG. 6
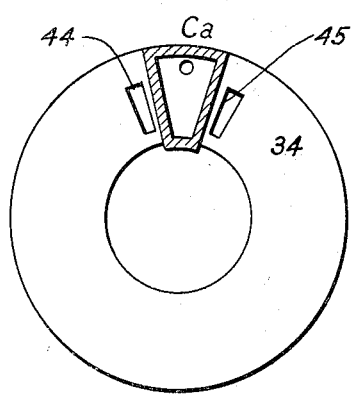
FIG. 7
FIG. 8
INVENTOR.
JAMES E. GRIFFITH
BY
Martin E. Anderson
ATTORNEY.

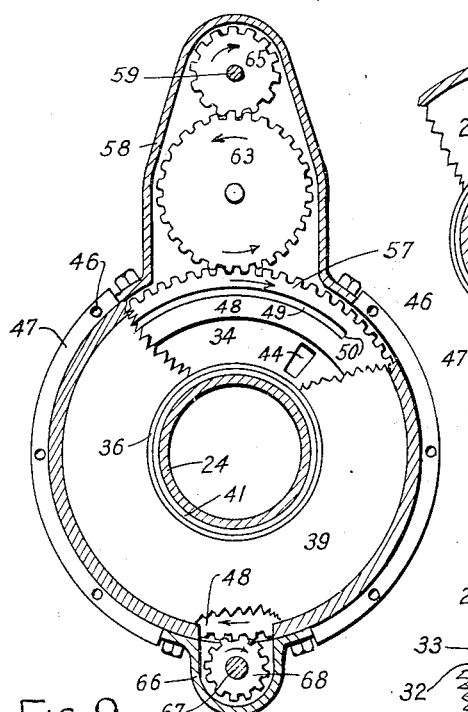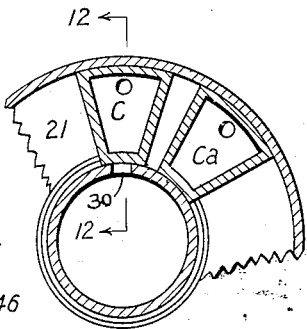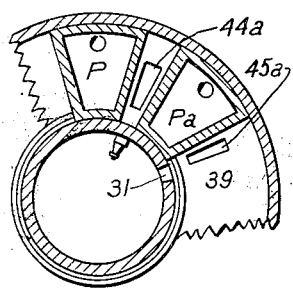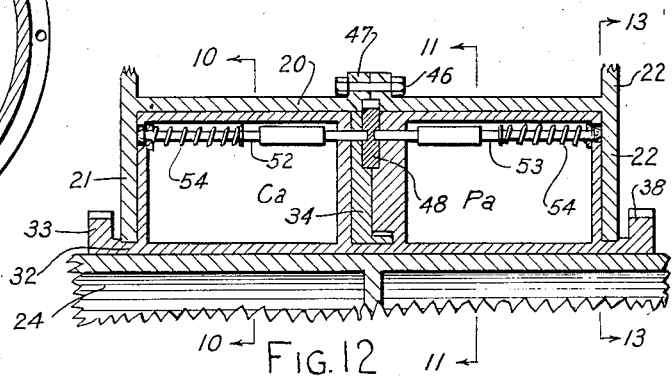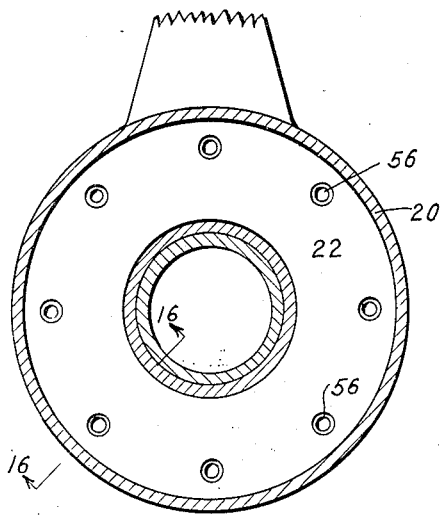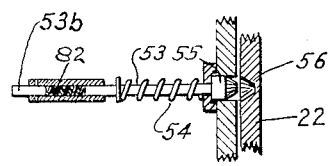

Jan. 23, 1945.   J. E. GRIFFITH   2,367,676
ROTARY INTERNAL-COMBUSTION ENGINE
Filed July 27, 1943   6 Sheets-Sheet 4
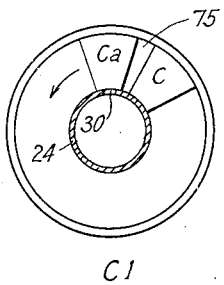
C1
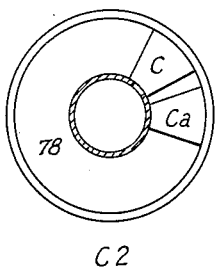
C2
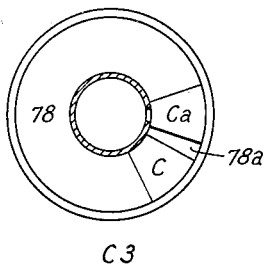
C3
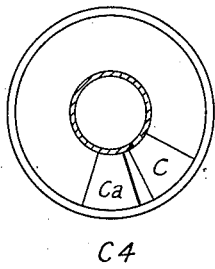
C4
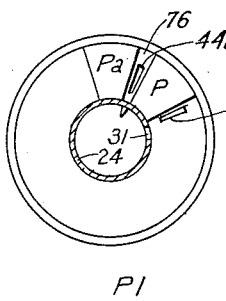
P1
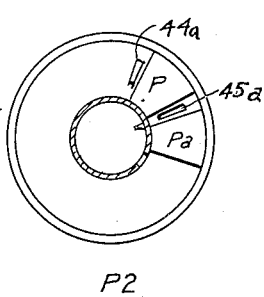
P2
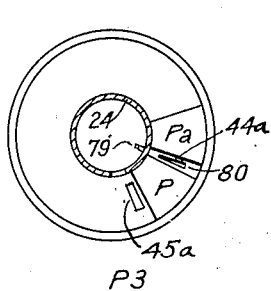
P3
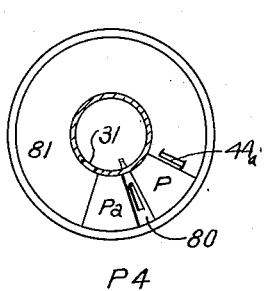
P4
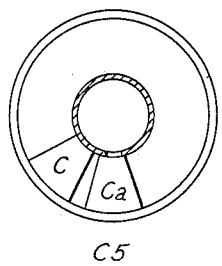
C5
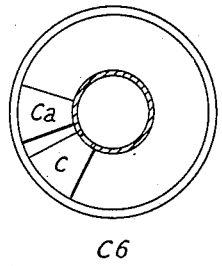
C6
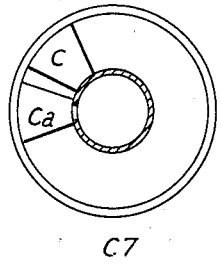
C7
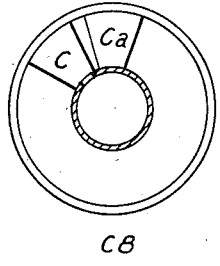
C8
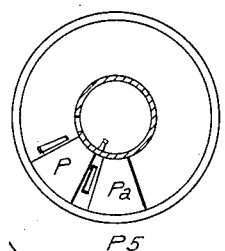
P5
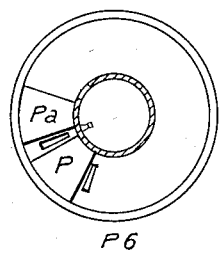
P6
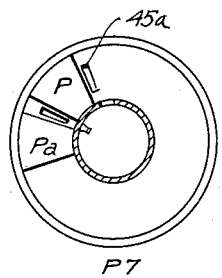
P7
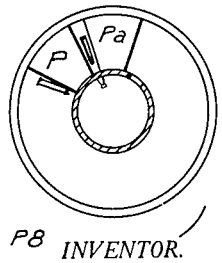
P8
FIG. 17
INVENTOR.
JAMES E. GRIFFITH
BY Martin E. Anderson
ATTORNEY.

Jan. 23, 1945.    J. E. GRIFFITH    2,367,676
ROTARY INTERNAL-COMBUSTION ENGINE
Filed July 27, 1943    6 Sheets-Sheet 5

INVENTOR.
JAMES E. GRIFFITH
BY
Martin E. Anderson
ATTORNEY.

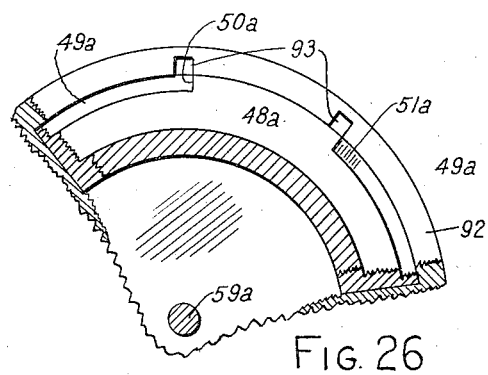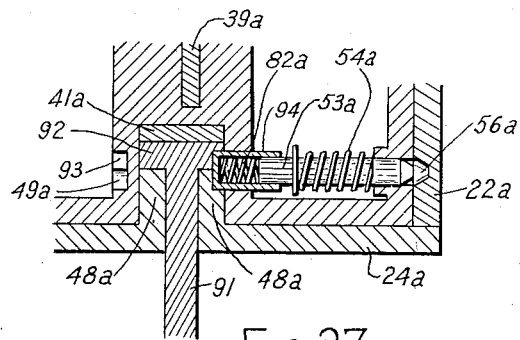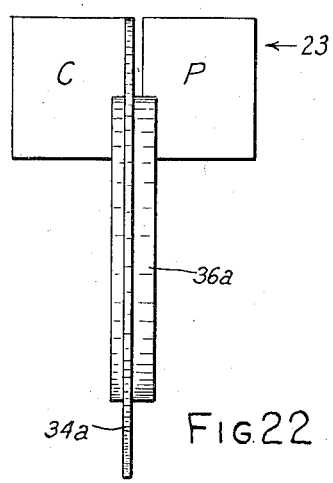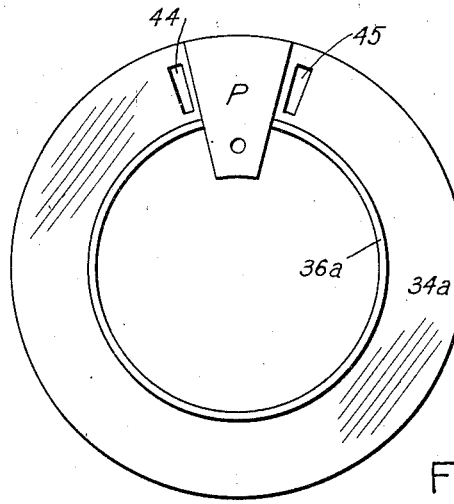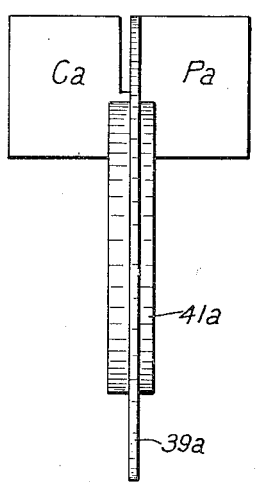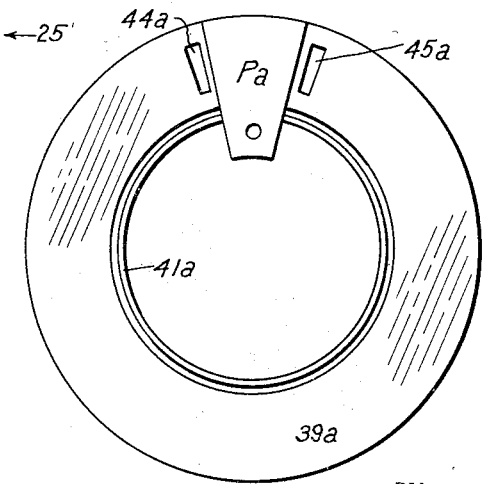

Patented Jan. 23, 1945

2,367,676

UNITED STATES PATENT OFFICE 2,367,676

ROTARY INTERNAL-COMBUSTION ENGINE

James E. Griffith, Denver, Colo.

Application July 27, 1943, Serial No. 496,361

11 Claims. (Cl. 123—11)

This invention relates to improvements in rotary internal combustion engines of the type described and claimed in Patent No. 2,304,406, granted to me on December 8, 1942.

For many purposes the ordinary reciprocating internal combustion engine is well suited, but for other purposes an engine of the rotary type would be more desirable.

It is the object of this invention to produce a rotary internal combustion engine of the general type referred to and which shall have the characteristics of a two-stroke cycle engine.

The principal object of the invention is to produce an engine of greater efficiency and of simpler construction than similar engines and which is of such design that it can be manufactured without the necessity of a large amount of special machinery.

Another object is to produce an engine in which each unit is independent, but of such construction that as many units as may be desired can be arranged to cooperate so as to form a multi-unit engine of any desired horse power.

In order to describe the invention in such a manner that it can be readily understood, reference will now be had to the accompanying drawings in which the invention has been illustrated in its preferred form, and in which:

Figure 1 is a vertical section taken on lines 1—1, Figures 2 and 3;

Figure 2 is an end view looking in the direction of arrow 2, in Figure 1;

Figure 3 is an end view looking in the direction of arrow 3, Figure 1;

Figure 4 is a vertically oblique view of the movable parts comprising the compression and power pistons with associated sealing members;

Figure 5 is a side elevation of one piston assembly;

Figure 6 is a view similar to that shown in Figure 5 and shows another piston assembly;

Figure 7 is a transverse section taken on line 7—7, Figure 5;

Figure 8 is a transverse section taken on line 8—8, Figure 6;

Figure 9 is a section taken on line 9—9, Figure 1;

Figure 10 is a section taken on line 10—10, Figure 12;

Figure 11 is a section take on line 11—11, Figure 12;

Figure 12 is a section taken on line 12—12, Figure 10;

Figure 13 is a section taken on line 13—13, Figure 12;

Figure 14 is a plane view showing a segment of the cam ring;

Figure 15 is an elevation looking in the direction of arrow 15, Figure 14;

Figure 16 is a detail view showing, to a somewhat enlarged scale, the interlock between the piston and the cylinder head, taken along line 16—16, Figure 13;

Figure 18:
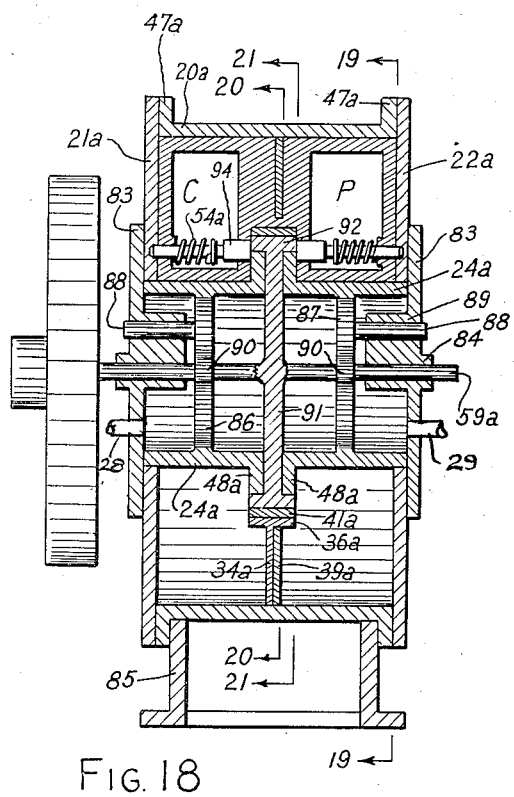
Figure 19:
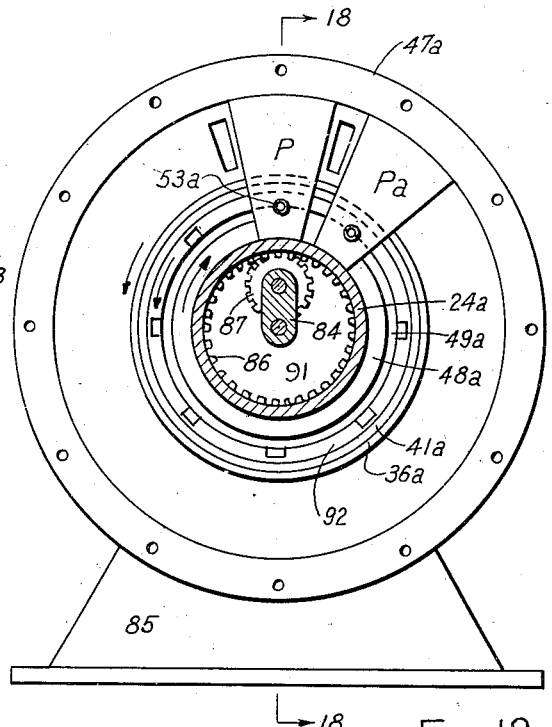
Figure 20:
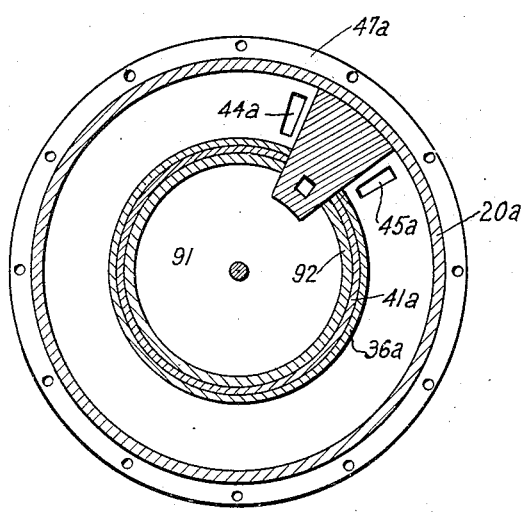
Figure 21:
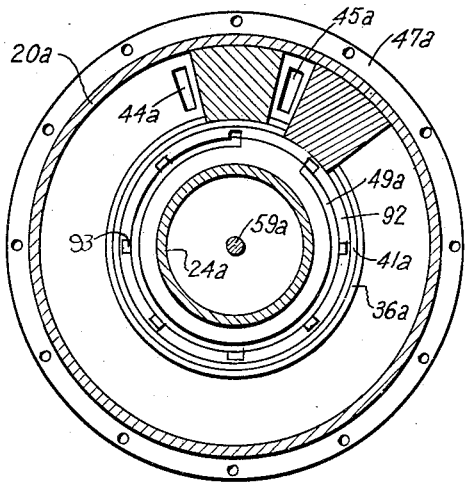

Figure 17 constitutes a group of sections taken in pairs along the transverse lines 17—17, Figure 1 and shows the progressive positions of the compression and power pistons, together with the rotary valve sleeve which contains the exhaust and intake ports;

Figure 18 is a vertical longitudinal section of a modified construction taken on line 18—18, Figure 19;

Figure 19 is an end elevation taken on plane 19—19, in Figure 18;

Figure 20 is a section taken on line 20—20, Figure 18;

Figure 21 is a section on line 21—21, Figure 18;

Figure 22 is a side elevation of a piston assembly and corresponds to Figure 5;

Figure 23 is an end elevation looking in the direction of arrow 23 in Figure 22 and corresponds to Figure 7;

Figure 24 is a side elevation of the other piston assembly and corresponds to Figure 6;

Figure 25 is an end elevation looking in the direction of arrow 25 in Figure 24;

Figure 26 is a detailed view showing a portion of the apparatus and is taken along line 21—21, in Figure 18; and Figure 27 is an enlarged detailed view showing the parts illustrated in Figure 18 to a somewhat larger scale.

In the drawings reference numeral 20 designates the engine cylinder and reference numerals 21 and 22 designate the cylinder heads. The heads are secured to the ends of the cylinder by suitable means such as the welds 23 shown in Figure 1. Reference numeral 24 designates a rotary valve that is divided into two compartments by means of a transverse diaphragm 25. The ends are closed by covers 26 and 27 which have been shown as integral with the valve cylinder, but which may be formed from separate parts and removably secured thereto. At each end of the cylindrical valve are tubular projections 28 and 29, the former being connected with a carburetor and the latter to an exhaust pipe. The carburetor and the exhaust pipe have not been shown, as a carburetor of ordinary construction is employed. The cylindrical wall of valve 24 is provided with an intake port 30 and an exhaust port 31. These ports are positioned on opposite sides of the center diaphragm and are angularly displaced to an extent and for a purpose which will be hereinafter explained.

Positioned within the cylinder and between the cylinder heads are two piston units which have been shown separately in Figures 5 and 6 and in assembled relation in Figure 4. The unit shown in Figure 5 consists of a ring 32 terminating in a gear 33. Formed integral with the inner end of ring 32 is a piston Ca and secured to the other end of this piston is a ring 34 having two annular areas of different thickness forming a rabbet 35. Extending outwardly from the center opening of this ring is a short cylindrical member or ring 36 and secured to the end of this ring is a piston Pa. The other piston assembly which has been shown in Figure 6, comprises a short cylindrical ring 37 from the outer end of which a gear 38 projects. Formed integral with the inner end of the cylindrical ring 37 is a piston P. Secured to the inner end of this piston is a ring 39 that is provided on its inner surface with a rabbet 40 of the same size and dimension as that designated by 35 in Figure 5. A short ring 41 is integrally connected with piston P and secured to the inner end of this ring is a piston C. It will be observed from Figure 8 that there is an annular gap 42 between the inner edge of ring 39 and the outer surface of ring 41. The thickness and diameter of this annular gap or opening is such that it will receive, with a sliding fit, the ring 36 carried by the piston assembly shown in Figure 5. It may be explained at this point that piston C is formed in two parts, the part designated by reference numeral 43 being integral with ring 41 and to this projecting portion 43 a piston C is secured by screws or other suitable means which have not been shown. Assuming now that piston C is removed from the part 43, the two piston assemblies can be interconnected by inserting the one shown in Figure 6 into the one shown in Figure 5 and after the parts have been thus assembled, piston C is secured to the part 43, whereupon the two piston units will form an assembly like that shown in Figure 4. Referring now to Figures 7 and 8 it will be seen that ring 34 is provided with two ports, 44 and 45, one located at each side of piston Ca and from Figure 8 it will be seen that ring 39 is provided with two similar ports designated by 44a and 45a, one on each side of piston P. The two piston units assembled as above are positioned on the rotary valve 24. The piston assembly is now inserted into the cylinder 20, which is made in two sections which are secured together by means of bolts 46 that pass through the flanges 47. Before the two piston units are assembled, the cam ring 48 is positioned between the two rings 34 and 39 in the annular recess formed by the complementary rabbets 35 and 40. The cam ring 48 is provided with a groove 49 that extends through an angular distance of about 315 degrees beginning at the vertical shoulder marked 50 and terminating at the incline 51. There is a similar groove on both sides of the ring as shown in Figure 15. Locking pins 52 and 53 are positioned respectively in the pistons marked C, Ca and P, Pa in the manner shown in Figure 12. A helical compression spring 54 surrounds each pin and urges it towards the cam ring 48. Each of the locking pins has a conical head 55 that is adapted to engage in a depression 56 on the inner surface of one of the cylinder heads. The cam ring is provided on its outer surface with gear teeth 57. Secured to the cylinder 20 is a housing 58 having opposed bearings in which the drive shaft 59 is journaled. The drive shaft is also journaled in bearings 60 in the extensions 61 and 62 of the cylinder head 21 and 22. An idler gear 63 is positioned within the housing 58 and rotates in the bearings 64. A gear 65 is positioned within the housing 58 and is in mesh with gear 63. The gear teeth of the idler 63 mesh with gear teeth 57 on ring 48. The gear ratio between gear 65 and the cam ring 48 are as 1 to 4, that is, gear 65 will rotate four times in order to rotate the cam ring one revolution. Relative directions of rotation are indicated by arrows in Figure 9. At the bottom of the cylinders, there is a removable housing 66 in which is journaled a shaft 67. A gear 68 is secured to the inner end of shaft 67 and is in mesh with the gear on the cam ring. Shaft 67 has its outer end journaled in a bearing 69 and secured to the outer end of this shaft is a gear 70. Gears 68 and 70 have the same pitch diameter. Secured to or formed integral with the valve cylinder 24 is a gear 71. This has the same pitch diameter as the gear on cam ring 48. It follows from the above that the valve cylinder 24 rotates at the same angular speed and in the same direction as the cam ring and it also follows that the valve cylinder rotates once for each four revolutions of the drive shaft 59.

Secured to the ends of the drive shaft on the outside of the extensions 61 and 62 are gear wheels 72 and 73, respectively. It will be observed from Figures 2 and 3 that these gears are incomplete, that is, they are provided with gear teeth through an angle of 180 degrees only, the remainder of the periphery being smooth as indicated by reference numerals 74. Gear wheel 72 is positioned to mesh with gear 33 and gear wheel 73 is positioned to mesh with the gear 38. It has previously been explained in connection with Figures 5 and 6 that gear 33 is connected with the piston assembly comprising the compression piston Ca and the power piston Pa, together with the sealing rings 34 and 36. Whereas, gear 38 is connected with the piston assembly comprising the power piston P and the compression piston C, together with the sealing rings 39 and 41.

Reference will now be made to Figure 4, in which is shown the relative positions of the two piston assemblies at the beginning of first power stroke. The two pistons C and Ca are very close together and have been shown as separated by a narrow gap designated by numeral 75. The power pistons P and Pa are narrower in an angular sense than the compression pistons and are separated by a space which has been designated by reference numeral 76 and which is wider than the space 75. In this initial position, the ports 44 and 44a are in alignment and this port has been designated by reference character 44a in Figure 4. With the parts in this position, I will proceed to explain the sequence of operation. The position shown in Figure 4 is that which corresponds to the diagrams $C_1$ and $P_1$ in Figure 17. It might be explained here that the groups of figures shown in Figure 17, have been arranged in pairs of which $C_1$ and $P_1$ indicate the first position and that each of the succeeding pairs designate the starting position at the ends of each piston movement, there being eight consecutive movements to a complete cycle, the last one being designated by $C_8$ and $P_8$.

With the parts positioned as shown in the first group in Figure 17, let us assume that the drive shaft is turned manually by means of a crank 77 in the direction of the arrow in Figure 1. This rotation will produce an engagement between the gear teeth on gear wheels 73 and gear 38 and as a result gear 38 with its attached pistons $Pa$ and $Ca$ will be rotated in a counterclockwise direction when viewed as in Figures 4 and 17. As soon as this relative rotation begins, the opening through the ports 44 and 44a will close and when the piston $Ca$ has moved a comparatively short distance, it uncovers the intake port 30, as will be seen from Figure 17. Since the intake port is in communication with the carburetor an explosive fuel mixture will be sucked into the compression chamber, which is thus being formed. When gear 73 has completed a half a revolution, the two piston assemblies will be in the position shown in $C_2$ and $P_2$ in Figure 17. The pistons $C$ and $P$ will have remained stationary, whereas the pistons $Ca$ and $Pa$ will have rotated through an angle of 270 degrees, or 3/4 of a complete circle. During this movement of the piston assembly, the space between the two pistons $C$ and $Ca$ will become filled with an explosive mixture which will occupy all of the space designated by reference numeral 78 in $C_2$ of Figure 17. Upon further rotation of shaft 59, gear wheels 72 will move into operative engagement with the gear 33 on the piston assembly shown in Figure 5 and when shaft 59 has completed its first revolution, the pistons will be in the position shown in $C_3$ and $P_3$ of Figure 17. The chamber 78 of $C_2$ has now been reduced in size as indicated by 78a in $C_3$. Whereas another chamber 78 is filled with an explosive gas mixture. It will be observed from $P_3$ in Figure 17, that the two pistons $Pa$ and $P$ are positioned adjacent each other as shown and that they are in communication with the compression chamber 78a through the ports 44 and 44a. A spark plug 79 is carried by the rotary valve 24 and at the end of each stroke the electrodes are in communication with the firing chamber 80. The engine is now primed and when the charge in chamber 80 is ignited, it will expand in the usual manner and increase the pressure. This will cause the piston $Pa$ with its attached piston $Ca$ to be rotated by the expansive force of the exploding gas and since at this point gear 73 is in position to be engaged by gear 38, gear wheel 73 with its attached parts, namely, gears 65 and gear wheel 72 will be rotated in the direction of the arrows in Figures 2 and 3. When pistons $Ca$ and $Pa$ arrive at the position shown in Figure 4, that point of gear wheel 72 which is at the top in Figure 3 will be at the bottom and in position to be engaged by gear wheel 33. At this point the chamber 81 on the following side of the piston $Pa$ will have uncovered the exhaust port 31. Chamber 81 is now full of exhaust gases, which, at this point, escape through the exhaust port. When the charge in chamber 80 is ignited, piston assembly comprising pistons $C$ and $P$, will then start rotating until the parts reach the position shown in $C_5$ and $P_5$ and this is continued in a progressive manner until the parts again arrive in the positions shown in $C_1$ and $P_1$ having thus completed a cycle. There are eight separate steps to each complete cycle and the positions corresponding to each have been illustrated in Figure 17.

It will now be explained how the pistons are locked and released so as to form stationary abutments and power pistons alternately as the engine operates. It has already been explained how the rotation of shaft 59 is communicated by means of gears 65 and 63 to the cam ring 48 and how the motion of the latter is transmitted by means of shaft 67 and gears 68 and 70 and 71 to the rotary valve 24. The gear ratios, as have already been explained, are such that for each half rotation of shaft 59, the rotary valve 24 will turn through an angle of 45 degrees and since this valve and the cam ring turn at the same angular speed, the latter will also move through an angle of 45 degrees for each half revolution of shaft 59.

It will be observed from the drawings that the rotary valve 24 and the cam ring turn in a clockwise direction, when viewed as in Figure 9, whereas the pistons move in a counterclockwise direction. It therefore follows that when the pistons have moved 3/4 of a revolution and the cam ring and the valve 24 have moved in the opposite direction 1/8 of a revolution, the parts will arrive in the same relative position as they were for the beginning of the next stroke. The pistons will make eight successive rotations for each complete cycle and the positions for each of these rotations are shown diagrammatically in Figure 17.

It will now be explained in what manner the pistons that have been operative to produce power will become latched against return movement at the end of each rotation so as to form abutments for the power cylinders during the firing or power rotation, and for the compression and intake cylinders.

Attention has already been called to the cam ring 48 and to the oppositely positioned cam grooves 49; from Figure 12 it will be seen that the two pistons of each assembly are provided with a locking pin 52 having one end provided with a conical head 55 and the other positioned in the cam groove 49. When the ends of the locking bars are in the cam grooves 49, the pistons are free to rotate in the cylinder because the spring 54 will then function to remove the head 55 from the depression 56 in the cylinder heads. When the locking pins arrive at the incline 51, they are moved outwardly and into engagement with the depressions 56. The locking pins are constructed of two parts as shown in Figure 16 and these are urged apart by means of a spring 82 which is compressed as the inclines 51 move the locking pins outwardly. At the point where one set of locking pins are moved into operating engagement, the other set drops off into the groove 49 at the shoulder 50, thus releasing the front pair of pistons at the time that the rear pair is locked. Since the ring 48 moves 1/8 of a revolution in the time that the pistons move 3/4 of a revolution, the locking pins will be operated at the same relative points during each stroke and there will therefore be a continuous succession of piston strokes during each of which one charge of gas is fired and the gases of combustion from the prior power stroke exhausted, a new charge sucked into the engine and another charge compressed ready to be transferred to the firing cylinder alternately through the opening produced by the registration of ports 44, 44a and 45, 45a.

In the drawings the specific means for sealing the several relatively movable parts has not been shown because it is contemplated that means already used in similar engines to effect a similar sealing operation will be employed. The means employed for effecting a seal between the pistons and the cylinder walls may be an adaptation of the means shown in United States Patent No. 1,305,966, patented June 3, 1919. For other parts of the engine suitable sealing means are to be employed, but since the invention is not limited to this particular feature, they have not been shown for to do so would merely complicate the drawings.

In the embodiment illustrated in Figures 1 to 16, inclusive, motion is transmitted from the piston units to the drive shaft by means of certain gears including the interrupted gears 72 and 73. In Figures 18 to 27, inclusive, a modification has been shown in which the power from the pistons is transmitted to the drive shaft by means which do not require the gears 72, 73, 33 and 38 and which therefore materially alters the appearance of the engine while maintaining the principle of operation and the important mechanical elements which have already been described.

Since this modification contains many elements that are identical and some which are merely slight variations of those shown in the embodiment above explained, such similar elements have been designated by the same or similar reference characters.

The cylinder 20a is constructed as a single unit and is provided with outwardly extending flanges 47a at each end. The cylinder heads have been designated by reference numerals 21a and 22a. Secured to each cylinder head is a plate 83 having a bearing 84 in which the shaft 59a rotates. The cylinder and cylinder heads are supported on some suitable base like that designated by reference numeral 85 which is merely illustrative of a base and the specific construction has therefore been shown in a diagrammatic manner.

In this embodiment the cylinder, which was shown in two parts in the first modification, has been shown as made of one single part and the rotary valve 24a, which corresponds to 24 in Figure 12, is made in two parts. The interior surface of each part 24a is provided with internal gear teeth 86 that are engaged by the teeth of an idler 87 which is mounted for rotation on a shaft 88 that turns in or is carried by the bearing 89. The shaft 59a is provided with gear teeth 90 that engage the idler. Since the tubular valve 24a is made in two parts, there are two sets of gears like those indicated in Figures 18 and 19. The gear ratio between the rotary valve and the shaft is as 1 is to 6 which corresponds to the 1 to 4 gear ratio between valve member 24 and shaft 59 in the first embodiment. It will be observed that the shaft 59a and the tubular valve 24a rotate in opposite directions. In this modification, it will be assumed that shaft 59a turns in a counterclockwise direction when viewed as in Figure 19 and consequently the valve 24a turns in a clockwise direction. Secured to the shaft is a disk 91 that terminates in a cylindrical flange 92. This flange extends to both sides of the disk as shown most clearly in Figure 27. The two valve portions 24a are provided with radially extending flanges 48a whose peripheries extend to the inner surfaces of the flanges 92 as shown in Figure 27.

Referring now to Figure 26 it will be seen that the flanges 48a are provided on their outer peripheries with rabbets 49a which correspond to the grooves 49 shown in Figures 14 and 15. These rabbets begin at the vertical shoulder 50a and end in the incline 51a the distance between the shoulder 51a and the incline being substantially forty-five degrees, the same as in Figure 14.

The ends of flange 92 are each provided with notches 93 for the reception of the plunger 94 which corresponds to the end 53b in Figure 16. Each piston is provided with a plunger 53a that is made in two parts. The inner part has been designated by 94 and has an opening for the reception of the end of plunger 53a. A spring 54a urges the plunger inwardly and another spring 82a urges the two parts away from each other. It will now be apparent that when the part 94 rests on the flat surface of flange 48a between the ends of the rabbet 49a, the end of the plunger 53a will be urged outwardly into the recess 56a in cylinder head 22a. The piston assembly will therefore be latched against rotary movement relative to the cylinder head in the manner explained in connection with the first embodiment. It may be explained here that the inner surfaces of the cylinder heads are provided with depressions 56 like those shown in Figure 13. As will be hereinafter explained, the valves 24a rotate in a clockwise direction when viewed as in Figures 19 and 26. When the shoulder 50a passes beyond the plunger 94, the latter drops into the rabbet and at that particular time the piston assemblies are so related to the rotating disk that, as the plunger drops from the flat surface, it will extend into the corresponding notch 93 and interconnect the piston assembly with the disk 91. The two parts will therefore be constrained to rotate in unison until they are separated by the action of the incline 51a. Since the power shaft is interconnected with the valves 24a in such a way that the latter rotates at one sixth of the angular speed of the shaft, in the opposite direction, the pistons and shaft will rotate three-fourths of a revolution during the time that the rotary valve turns one-eighth of a revolution and the parts will therefore get into the same relative position from which they started, four times during each cycle of operation. (By a cycle in this relation is meant the number of power strokes required to bring the piston and parts back to the position shown in $C_1$, $P_1$, Figure 17.) When a piston unit arrives at the points where the incline 51a commences, the stationary unit that is held against rotation in the cylinder by means of the plunger 53a that is held in latching position so long as the part 94 rests on the flat surface between the ends of the rabbet 49a is released. When the plunger of the moving unit of pistons arrives at the top of the incline, the other plunger will drop over shoulder 50a onto the bottom of the rabbet and into one of the latching grooves 93. It will be seen that when one piston unit is unlatched from the cylinder heads it will immediately become latched to the power shaft and at the same time the piston unit that was latched to the shaft is released and becomes latched in stationary position. This latching and releasing takes place at the end of each power stroke and occurs eight times during each cycle. It might be explained here that the engine can be designed so that greater or lesser number of power strokes are required per cycle and that eight has been selected because it gives a convenient way of illustrating and explaining the operation.

With the constructions described, only a single spark plug is required since it is attached to the rotary valve member 24 and therefore maintains a fixed position with respect to the pistons at the point where the charge is to be ignited.

The timing mechanism has not been shown, but it may be explained that cooperating contacts one on the rotary valve and a plurality on the cylinder head may be employed.

The compact arrangement of the parts in the modification shown in Figures 18 and 25 produce an engine of neat appearance.

The carbureter connection and the exhaust have been designated, respectively, by reference numerals 28 and 29 in Figure 18. The intake and exhaust ports 30 and 31 have not been shown in Figures 18 and 25, but it is to be understood that they are positioned as shown in Figure 1 and described in connection with Figures 1 to 17.

From the above description, when taken in connection with the drawings, it will be seen that the engine herein disclosed is of such construction that instead of reciprocating in the usual manner, the pistons rotate in annular cylinders and alternately form the abutments and movable power pistons. Such engines are admirably adapted for interconnecting so as to increase the power output to any multiple of that delivered by any single unit.

Since there are two power pistons P and Pa and since they function alternately, it is evident that each piston makes four power strokes for each cycle and that the length of the stroke is 270 degrees.

Having described the invention what is claimed as new is:

1. In an internal combustion engine of the rotary type, an annular cylinder, two piston units mounted for movement in the cylinder, each unit comprising an assembly of two longitudinally spaced pistons, the pistons of each unit being interconnected at their opposed adjacent ends by a ring concentric with the cylinder, the pistons of one assembly traveling in the same path as the correspondingly positioned pistons of the other assembly, the piston assemblies being movable alternately and forwardly by a step by step movement, means for latching one unit of pistons against movement relative to the cylinder at the end of its stroke and for simultaneously releasing the other unit, a drive shaft parallel with the axis of the cylinder, means for interconnecting the released piston unit with the drive shaft and for maintaining it in interconnection until the same is latched to the cylinder head.

2. In an internal combustion engine of the rotary type, an annular cylinder, two piston units mounted for rotation in the cylinder, each unit comprising an assembly of two longitudinally spaced pistons, the pistons of each unit being interconnected at their opposed adjacent ends by a ring concentric with the cylinder, the pistons of one assembly traveling in the same path as the corresponding positioned pistons of the other assembly, the piston assemblies being movable alternately and forwardly by a step by step movement, means for latching one unit of pistons at the end of their stroke and for simultaneously releasing the other unit, the piston units having hub portions terminating in gears positioned outside of the cylinder, means comprising a drive shaft rotatable about an axis parallel to the axis of the cylinder and two incomplete gears carried by the shaft for interconnecting the pistons for alternate forward movement, a rotary cylindrical valve positioned and journaled in the piston assemblies, and means for rotating the rotary valve at a speed one-fourth that of the shaft and in a direction opposite to that at which the pistons travel.

3. An internal combustion engine comprising an annular cylinder, a stationary support therefor, a head at each end, each of which has a bearing concentric with the cylinder, two piston units positioned in the cylinder, each piston unit comprising a gear positioned on the outside of a cylinder head, a pivot ring carried by the outer piston of each unit and mounted for rotation in the cylinder head bearing, two longitudinally spaced pistons, a sealing ring positioned at the space between the pistons and interconnecting them, each piston unit having a valve ring rigidly attached to the inner end of the outer piston, a rotary cylindrical valve positioned within the piston units, said rotary valve having a partition dividing it into two compartments, the wall of one compartment having an opening forming an intake port and the wall of the other compartment having an opening forming an exhaust port, a power shaft mounted for rotation about an axis positioned outside of the cylinder, means for rotating the cylindrical valve at a speed one-fourth that of the shaft, and in the opposite direction, and interconnecting means between the shaft and each piston assembly for alternately rotating each piston assembly seven-eighths of a revolution, in a direction opposite to that in which the cylindrical valve rotates, during each half revolution of the shaft, and ignition means for the motor.

4. An internal combustion engine, comprising in combination, a stationary outer cylinder, an annular closure for each end thereof, a cylindrical valve mounted for rotation in the openings in the end closures, bearings positioned outside of the cylinder, a power shaft mounted for rotation in the bearings, the axis of the shaft being parallel with the axis of the cylindrical valve, two piston units mounted for rotation in the annular space between the cylinder and the cylindrical valve, each unit comprising two longitudinally spaced pistons, one piston of each unit and the correspondingly positioned piston of the other unit forming a pair, the two pistons of each unit being interconnected by means comprising a narrow cylindrical ring, the two rings being of such diameters that one will fit over the other, a flat ring secured to the inner end of one of the pistons of each unit, one of the rings having a gas tight connection with the larger interconnecting ring, means comprising a gear mechanism for alternately rotating the interconnected pistons of the two pairs through a predetermined angular distance, means for latching the pistons at the end of each angular movement, means for delivering a charge of compressed gaseous fuel into the space between adjacent pistons of one pair at the end of the angular movement, means for igniting the fuel whereby the unlatched piston will be given a rotary movement, and means for transmitting motion from the rotating piston to the drive shaft.

5. An internal combustion engine comprising a cylinder having cylinder heads provided with bearings concentric therewith, two piston units positioned in the cylinder, each unit comprising a cylindrical journal portion for cooperating with the bearing in one cylinder head, the outer ends of the journals being formed with gear teeth, each unit comprising two longitudinally spaced pistons, one of which is attached to the inner end of the cylindrical journal, a sealing ring attached to the inner end of the piston that is attached to the cylindrical journal, a sealing ring interconnecting the spaced pistons which are positioned in axial alignment with each other, the inner end of the first mentioned piston of each unit having secured thereto a combined partition ring and valve, each partition ring having a port opening on each side of the piston to which it is attached, a cylindrical rotary valve positioned in the piston assemblies, said rotary valve having its interior divided into two chambers by a transverse partition, the wall in one chamber having an opening forming an intake port and the wall in the other chamber having an opening forming an exhaust port, means for effecting a continuous rotation of the rotary valve, comprising, a shaft, and means also comprising the shaft and a gear connection for alternately turning the piston units through angles of 315 degrees during the time that the rotary valve turns through an angle of 45 degrees, and means for locking one piston assembly and releasing the other at the end of each rotation.

6. An internal combustion engine having, in combination, a cylinder provided with opposed heads having bearings concentric therewith, two piston units mounted for rotation in the cylinder, the ends of the piston units comprising short cylindrical sections journaled in the bearings in the cylinder heads, the outer end of each cylinder journal section having gear teeth, each piston unit comprising two longitudinally spaced pistons, one of which has one end connected with the inner end of a cylindrical journal section, a ring concentric with the journal section, connected with the inner end of the first piston, the second piston being also connected with the ring, the inner end of the outer piston of each piston assembly having secured to it a ring provided with ports adjacent the opposite sides of the piston to which it is attached, the two rings forming a partition separating the cylinder into two annular chambers, one of which forms a charge forming and compressing device and the other the power producing engine, the two partition rings having complementary rabbets, an annular cam ring positioned in the recess formed by the rabbets, the periphery of the cam ring having gear teeth, locking means in each piston comprising bars adapted to project through the ends thereof, one end of each locking bar engaging a side of the cam ring having a cam groove and a cam on each side, resilient means for urging the locking bars into engagement with the cam ring, the inner surfaces of the cylinder head having angularly spaced recesses for the reception of the locking bars, a rotary cylindrical valve positioned in the piston assemblies, means comprising gears for effecting a simultaneous and equiangular rotation of the cam ring and the rotary valve, in the same direction, the valve being divided into two chambers by a transverse partition, the wall in one chamber having an opening forming an intake port, the wall in the other chamber having an opening forming an exhaust port, a drive shaft, a gear device for transmitting rotation from the shaft to the cam ring at a given ratio, and in the same direction, and means for effecting an intermittent and alternate rotation of the piston units in a direction opposite to that in which the cylindrical valve rotates.

7. An internal combustion engine of the rotary type comprising a cylinder formed by a cylindrical member whose ends are provided with closures having bearings concentric therewith, two piston units positioned in the cylinder, each unit comprising a ring journaled in a bearing in a cylinder head, a piston attached to the inner end of the ring, a sealing ring attached to the inner end of the piston and a second piston attached to the inner end of the sealing ring, combined sealing and valve rings attached to the inner ends of the first mentioned pistons, each valve ring having two port openings, one on each side of the piston to which it is attached, a rotary valve positioned in the valve assemblies, the interior of the rotary valve being divided into two chambers by a transverse partition, one chamber being in communication with a source of explosive fuel and the other with an exhaust pipe, the wall of the rotary valve having two angularly displaced ports communicating the chambers with the engine cylinder, means for alternately turning the piston units through a given angle, means for automatically latching and releasing the piston units at the end and at the beginning of each movement, and means for turning the rotary valve member in the opposite direction to that at which the pistons move and through an angle equal to the difference between the angular movement of the piston and 360 degrees during each piston movement.

8. In an internal combustion engine of the rotary type, an annular cylinder, two piston units mounted for movement in the cylinder, each unit comprising an assembly of two longitudinally spaced pistons, the pistons of each unit being interconnected at their opposed adjacent ends by a ring concentric with the cylinder, the inner piston of one assembly traveling in the same path as the outer piston of the other assembly, the piston assemblies being movable alternately and forwardly by a step by step movement, means for latching one set of pistons against movement relative to the cylinder at the end of its stroke and for simultaneously releasing the other set, a drive shaft mounted for rotation about an axis coincident with the cylinder, means operated by the latching and releasing means for interconnecting the piston unit that has been released from the cylinder to the drive shaft, whereby the rotary movement of the piston will be transmitted thereto and for releasing the other piston unit from the drive shaft as soon as it is latched against further rotation relative to the cylinder whereby the shaft will receive successive impulses from the two piston units.

9. A piston unit for use in a rotary internal combustion engine, comprising a cylindrical sealing ring, and two pistons carried thereby, one at each end of the ring, the pistons each having a portion extending beyond the outer surface of the ring, a flat ring lying in a plane perpendicular to the axis of the sealing ring, surrounding the latter and concentric therewith, carried by the inner end of one of the pistons, said flat ring having an opening on each side of the piston to which it is attached, the two openings serving alternately as ports for the passage of compressed gases.

10. In a rotary internal combustion engine, an annular cylinder, two piston units mounted for movement therein, each unit comprising an assembly of two longitudinally spaced pistons, the pistons of each unit being interconnected at their adjacent ends by a ring concentric with the cylinder, the corresponding pistons of the two units being positioned to move in the same path, the two units being movable alternately by a step by step motion, the cylinder having cylinder heads, a power shaft rotatably connected with the cylinder, and means for alternately connecting and disconnecting the piston units with the cylinder heads and with the power shaft.

11. In a rotary internal combustion engine, an annular cylinder, two piston units mounted for movement therein, each unit comprising an assembly of two longitudinally spaced pistons, the pistons of each unit being interconnected at their adjacent ends by a ring concentric with the cylinder, the corresponding pistons of the two units being positioned to move in the same path, the two units being movable alternately by a step by step motion, the cylinder having cylinder heads, a power shaft rotatably connected with the cylinder, means for latching one unit of pistons to a cylinder head at the end of each step by step movement, and means for simultaneously releasing the other piston unit from the cylinder head and connecting it with the power shaft, whereby the two units will alternately function as abutments and as power pistons.

JAMES E. GRIFFITH.